(12) United States Patent
Isobe et al.

(10) Patent No.: US 7,504,780 B2
(45) Date of Patent: Mar. 17, 2009

(54) POWER SUPPLY UNIT FOR LIGHT SOURCE AND METHOD OF CONTROLLING THE SAME

(75) Inventors: Shiro Isobe, Kamiina-gun (JP); Tomotaka Mori, Ina (JP); Toshitaka Fujii, Tanba (JP); Atsuji Nakagawa, Asago (JP)

(73) Assignees: Rubycon Corporation, Nagano (JP); Phoenix Electric Co., Ltd., Hyogo (JP)

( * ) Notice: Subject to any disclaimer, the term of this patent is extended or adjusted under 35 U.S.C. 154(b) by 0 days.

(21) Appl. No.: 11/734,290

(22) Filed: Apr. 12, 2007

(65) Prior Publication Data

US 2008/0180953 A1    Jul. 31, 2008

(30) Foreign Application Priority Data

Jan. 30, 2007    (JP) ............................. 2007-018880

(51) Int. Cl.
*H05B 37/02*    (2006.01)
(52) U.S. Cl. ...................... 315/194; 315/307; 315/308
(58) Field of Classification Search ............. 315/307, 315/308, 246, 247, 291, 194, 195
See application file for complete search history.

(56) References Cited

U.S. PATENT DOCUMENTS 4,396,871 A * 8/1983 Scheuermann ............... 315/291

FOREIGN PATENT DOCUMENTS

| JP | 2-119005 A | 5/1990 |
|---|---|---|
| JP | 2006-227440 A | 8/2006 |
| JP | 2006-349912 A | 12/2006 |

* cited by examiner

*Primary Examiner*—David Hung Vu
(74) *Attorney, Agent, or Firm*—Buchanan Ingersoll & Rooney PC (57) ABSTRACT

A power supply unit capable of varying power supplied to a light source at timings determined by synchronization signals is provided. The power supply unit comprises an interface that receives a plurality of types of synchronization signals with different pulse widths and a control unit that changes a setting of output power supplied by the power supply unit in accordance with the pulse widths of the plurality of types of synchronization signals. The control unit includes obtaining a standard time interval from a cycle of a standard type of synchronization signal that has a longest pulse width, parsing for determining type of each synchronization signal, redefining supply power values corresponding to respective types of synchronization signals, and changing the setting of output power of the power supply unit to a supply power value corresponding to a type of the synchronization signal.

8 Claims, 8 Drawing Sheets

| Signal pulse width | Pulse height | Resistance R1 (5V side) | Resistance R2 (GND side) |
|---|---|---|---|
| Ts1 | L1 | R1-1 | R2-1 |
| Ts2 | L2 | R1-2 | R2-2 |
| Ts3 | L3 | R1-3 | R2-3 |
| Ts4 | L4 | R1-4 | R2-4 |

Fig. 5B

| Pulse height [%] | R1 (5V side) [kΩ] | R2 (CND side) [kΩ] |
|---|---|---|
| 50.00 | 5.6 | 1.3 |
| 55.00 | 4.3 | 1.2 |
| 60.00 | 3.6 | 1.2 |
| 65.00 | 5.1 | 2.0 |
| 70.00 | 3.3 | 1.5 |
| 75.00 | 8.2 | 4.3 |
| 80.00 | 3.0 | 1.8 |
| 85.00 | 8.2 | 5.6 |
| 90.00 | 3.9 | 3.0 |
| 95.00 | 1.8 | 1.6 |
| 100.00 | 4.7 | 4.7 |
| 105.00 | 2.4 | 2.7 |
| 110.00 | 3.0 | 3.9 |
| 115.00 | 5.6 | 8.2 |
| 120.00 | 1.8 | 3.0 |
| 125.00 | 4.3 | 8.2 |
| 130.00 | 1.5 | 3.3 |
| 135.00 | 2.0 | 5.1 |
| 140.00 | 1.3 | 3.9 |
| 145.00 | 1.2 | 4.3 |
| 150.00 | 1.3 | 5.6 |

| 1/(Standard time interval Tb) | Ts1 | Ts2 | Ts3 | Ts4 | T0 | unit |
|---|---|---|---|---|---|---|
| | | 0.7813 | 1.5626 | 2.3439 | 3.1252 | 3.9065 | % |
| | 2/256 | 4/256 | 6/256 | 8/256 | 10/256 | Tsj/Tb |
| | | 2.81 | 5.63 | 8.44 | 11.25 | 14.06 | deg |
| 200Hz (Tb=5000.0 μs) | 39 | 78 | 117 | 156 | 195 | uS |
| 120Hz (Tb=8333.3 μs) | 65 | 130 | 195 | 260 | 326 | uS |
| 50Hz (Tb=20000.0 μs) | 156 | 313 | 469 | 625 | 781 | uS |

| Segment time interval Cjk | | R 1.852 | Y 0.694 | G 1.783 | W 1.99 | B 2.014 | Tb=8.333mS |
|---|---|---|---|---|---|---|---|
| mode0 | Level setting | 70% | 100% | 70% | 105% | 70% | SUM=80.86% |
| | Level selection | L1 | L4 | L1 | L2 | L1 | |
| | Current after resetting | 86.57% | 123.68% | 86.57% | 129.86% | 86.57% | |
| mode1 | Level setting | 105% | 100% | 70% | 70% | 105% | SUM=88.74% |
| | Level selection | L2 | L4 | L1 | L1 | L2 | |
| | Current after resetting | 118.33% | 112.69% | 78.89% | 78.89% | 118.33% | |
| mode2 | Level setting | 145% | 105% | 105% | 100% | 145% | SUM=122.36% |
| | Level selection | L3 | L2 | L2 | L4 | L3 | |
| | Current after resetting | 118.50% | 85.81% | 85.81% | 81.72% | 118.50% | |

Fig. 9

POWER SUPPLY UNIT FOR LIGHT SOURCE AND METHOD OF CONTROLLING THE SAME

CROSS-REFERENCE TO RELATED APPLICATION

This application is based upon and claims the benefit of priority from the prior Japanese Patent Application No. 2007-18880, filed Jan. 30, 2007, the entire contents of which are incorporated herein by reference.

BACKGROUND

The present invention relates to a power supply unit suited to lighting a light source, and to a method of controlling the same.

A power supply unit (or "stabilizer" or "ballast") that uses a back converter (a step-down converter) or the like is known as a power supplying apparatus for lighting a discharge lamp. Discharge lamp such as a high-pressure discharge lamp (or "high-intensity discharge" (HID) lamp) is one of types of light sources. Discharge lamps are used in a variety of applications. One application is the light source (provided as an illumination unit) of an image output system, with the concept of an "image output system" including a projector (a front projector or a rear projector) that displays color images on an image forming medium such as a screen. One method of displaying color images is to display pixels of multiple colors (for example, the primary colors R, G, and B) using time division. One means for producing light of the respective colors from light (a light beam) outputted by a light source for white or near white light according to time division uses a rotating color filter called a "color wheel". By modulating the light of the respective colors produced by the color filter according to time division in synchronization with the movement of the color filter, it is possible to form images of the respective colors. One example of a device that generates images by modulating light (variously referred to as a "light modulating device", a "light valve", or an "image generating device") is an image generating device that includes a plurality of optical elements that can modulate light in pixel units. Examples of this type of image generating device are both transmissive and reflective liquid crystal devices and DMDs (digital mirror devices).

Japanese Laid-Open Patent Publication No. 2006-349912 discloses a projection system that is lighted using a DC current and includes a rotating color filter that is divided into a plurality of color segments that are red, green, and blue or a plurality of segments that includes segments for blue, green, red and others so as to subject a beam emitted from a light source to time division. This projector system generates synchronization signals with a plurality of ON/OFF patterns at a predetermined time in synchronization with optical elements and the rotation of the color filter. Japanese Laid-Open Patent Publication No. 2006-349912 also discloses a construction that realizes superior tonal reproduction across the entire tonal range by superimposing a current, such as "first negative pulses", of a certain current intensity in accordance with the ON/OFF patterns onto the applied DC current a fixed time (T0) after the timing of a falling edge corresponding to a red segment or a blue segment.

Japanese Laid-Open Patent Publication No. H02-119005 discloses an illumination device for an electronic endoscope where illumination light from a light source is emitted via a rotating color wheel including a plurality of filter areas. In this publication, the illumination device is also equipped with a position detecting means for detecting the respective filter areas provided on the rotating color wheel and a light source intensity adjusting means that adjusts the intensity of light emitted from the light source in accordance with the respective filter areas based on a signal from the position detecting means.

Japanese Laid-Open Patent Publication No. 2006-227440 discloses a technology that is operable, when light of a plurality of colors such as RGB is repeatedly generated using a filter from light generated by an AC lamp for use in a projector device, to synchronize the timing of changes in the polarity of the lamp current (i.e., the AC current supplied to the AC lamp) with the timing at which the color of light changes. This publication states that by changing the magnitude of the lamp current in half cycles synchronized with the cycle for generating light of a specified color, the intensity of the light of that color can be increased and decreased. This publication also states that it is possible to adjust the intensity of light of any color and therefore possible to freely adjust the white balance of projected images projected by the projector device. To do so, power control signals are used in addition to synchronization signals.

There is demand for flexible control that can synchronize the output (intensity) of an illumination device with movement of a color filter (color wheel, etc.), an image signal, or the like. One method of controlling the output of an illumination device is to control the power supplied to the light source, for example the discharge lamp, of the illumination device. Since the voltage supplied from the power supply unit to the discharge lamp becomes substantially constant when discharge is stabilized, the supplied power is controlled by controlling the current supplied from the power supply unit to the discharge lamp. Accordingly, there is demand for a power supply unit that can easily change the value of the supply current in synchronization with a synchronization signal.

A power supply unit that can flexibly change the supply power in synchronization with predetermined signals has wide applicability for the various specifications of illumination devices. This makes it possible to reduce the time required to develop and design a power supply unit, which reduces costs. For example, to improve contrast, some color filters include segments that are white (openings, W) or another color in addition to segments of the colors red (R), green (G), and blue (B). The respective areas of the segments of a color filter differ according to how the illumination device is being applied, and the light intensity required by different segments often changes between illumination devices. In addition, when a sequence of segments of different colors such as RGB is treated as a unit, the cycle for controlling the light intensity does not need to match such unit, and the light intensity may be controlled with a plurality of such units as one cycle. The light intensity may be changed in synchronization with the segments of the respective colors on the color filter, or the light intensity may be changed in between such segments.

A power supply unit that can flexibly (dynamically) change (reconfigure) the power supplied in synchronization with predetermined signals during operation of an illumination device and/or during initial settings enables the illumination device to be put to a wider range of applications. For example, such power supply unit makes it possible to equip an illumination device with a function for changing the white balance and/or tones (combinations of colors) in accordance with the type of images displayed by the user. By doing so, it becomes possible to reduce the processing load of an image generating device and to display images of significantly higher quality.

SUMMARY

One aspect of the present invention is a power supply unit capable of varying the power supplied to a light source at timings determined by synchronization signals. The power supply unit includes: an interface that receives a plurality of types of synchronization signals with different pulse widths; and a control unit that changes a setting of the output power supplied by the power supply unit in accordance with the pulse widths of the plurality of types of synchronization signal that have been received. The control unit can set the supplied power to be outputted in response to a synchronization signal based on the pulse width of that synchronization signal. This means that by merely supplying synchronization signals of different pulse widths to the power supply unit, it is possible to flexibly control the power (the supplied current, for example) supplied to the light source in synchronization with the synchronization signals. It is possible to provide a power supply unit that has wide applicability for illumination apparatuses for a variety of uses and can dynamically change the intensity of light outputted from the light source. Examples of "light source" are such as a discharge lamp, white LEDs, and the like.

The "controlling a power supply unit in accordance with the pulse widths of the plurality of synchronization signal types that have been received" includes having the pulse widths directly or indirectly designate settings of the output power. It is preferable to indirectly determine the setting of the output power via an appropriate conversion table such as a lookup table with the pulse width of a synchronization signal as an index. The pulse widths of the synchronization signals can be given a plurality of meanings (designated contents), including the setting (supply power value) of the output power. One of such meanings is a function for defining the standard cycle.

The control unit should preferably include: obtaining a standard time interval from a cycle of a standard type of synchronization signal that has a longest pulse width out of the plurality of types of synchronization signals that have been received; determining the type of each synchronization signal included in the plurality of types of synchronization signals received from the ratio of the pulse width of each synchronization signal to the standard time interval; obtaining the intervals of respective synchronization signals received; redefining, when any of the standard time interval, the combination of the plurality of types of synchronization signals included in the standard time interval, and the intervals between the respective synchronization signals changes, supply power values corresponding to respective types of synchronization signal included in the plurality of types of synchronization signals received; and changing, after a first delay time from a leading edge of a synchronization signal, the setting of output power of the power supply unit to the supply power value corresponding to a type of the synchronization signal.

A number of methods may be available for defining and determining the pulse widths of the synchronization signals. If clock signals that are extremely precise are supplied to both the generator of the synchronization signals and the power supply unit, it will be possible to determine the pulse width in synchronization with the clock signals. Alternatively, by obtaining the standard time interval from the cycle of a standard type of synchronization signal that has the longest pulse width out of the received plurality of types of synchronization signals, the standard time interval may becomes a standard period for both the generator of the synchronization signals and the power supply unit and it is possible to determine the pulse width using the standard period. It is expected that the light intensity to be controlled by the power supply unit will not vary so much. Accordingly, it will be possible to achieve sufficient communication between the generator of the synchronization signals and the power supply unit if the ratio between the pulse widths of the respective synchronization signals received and the standard time interval can be expressed with a definition of around 8 bits (256 levels), for example.

When any of the standard time interval, the combination of the plurality of types of synchronization signals included in the standard time interval, or the intervals between the respective synchronization signals changes, the total of intensity of light outputted in the standard time interval Tb also changes. Accordingly, it is preferable to redefine (readjust, reset) the power supplied corresponding to the respective types of synchronization signals included in the received plurality of types of synchronization signals. One of the cases of the redefining the supply power values is dynamically redefining or reconfiguring the values of the supply power and the other one of the cases is making an initial setting of the values of supply power.

The function unit of redefining the supply power values should preferably include finding a total, for a standard time interval, of products of supply power ratios corresponding to the respective types of synchronization signals and the intervals of the respective synchronization signals and calculating the supply power values corresponding to the respective types of synchronization signals so that the total becomes constant. By using the functions, it is possible to automatically set the supplied power corresponding to the various synchronization signals so that the power supplied to the light source in the standard time interval becomes constant, that is, so that the average supplied power becomes constant. Accordingly, the user only needs to relatively define, using a lookup table or the like, the power to be supplied, or the intensity to be achieved by the light source, for the respective synchronization signals.

The pulse widths of the respective synchronization signals received are not constant. Accordingly, it is preferable to change the setting of the output power of the power supply unit to a supply power value corresponding to a type of a synchronization signal after a first delay time from a leading edge of that synchronization signal. The control unit may further include a function unit of setting the first delay time in proportion to the standard time interval.

One of other aspects of the present invention is an illumination unit including the power supply unit described above and a light source that receives power supplied by the power supply unit.

Further one of other aspects of the present invention is an image output system including: the illumination unit described above; a color filter that carries out time division to divide light outputted from the illumination unit to light of a plurality of colors; an image generating unit that modulates light that has been transmitted by the color filter; and an optical system that projects the light modulated by the image generating unit onto an image forming medium.

Further one of other aspects of the present invention is a method of controlling a power supply unit capable of varying power supplied to a light source at timings determined by synchronization signals. The method includes:

receiving, via or by an interface, a plurality of types of synchronization signals with different pulse widths; and changing, by a control unit, a setting of output power of the power supply unit in accordance with the pulse widths of the plurality of types of synchronization signals that have been received.

The step of changing the setting of output power should preferably also include:

obtaining a standard time interval from a cycle of a standard type of synchronization signal that has a longest pulse width out of the plurality of types of synchronization signals received;

determining the type of each synchronization signal included in the received plurality of types of synchronization signals from the ratio of the pulse width of each synchronization signal to the standard time interval;

obtaining the intervals of respective synchronization signals received;

redefining, when any of the standard time interval, the combination of types of synchronization signals included in the standard time interval, and the intervals between the respective synchronization signals changes, supplied power values corresponding to the respective types of the synchronization signals included in the received plurality of types of synchronization signals; and changing, after a first delay time from a leading edge of a synchronization signal, the setting of output power of the power supply unit to a supply power value corresponding to a type of the synchronization signal.

The step of redefining supply power values should preferably includes finding a total, for a standard time interval, of products of supply power ratios corresponding to the respective types of synchronization signals and the intervals of the respective synchronization signals and calculating the supply power values corresponding to the respective types of synchronization signals so that the total becomes constant.

Further one of other aspects of the present invention is a program product for causing a control unit of a power supply unit capable of varying power supplied to a light source at timings determined by synchronization signals. One of typical control unit includes a microprocessor and the program product includes firmware for controlling the microprocessor. The program product includes changing, when a plurality of types of synchronization signals with different pulse widths are received via an interface, by the control unit, a setting of output power of the power supply unit in accordance with the pulse widths of the plurality of synchronization signal types that have been received.

The step of changing the setting of output power includes:

obtaining a standard time interval from a cycle of a standard type of synchronization signal that has a longest pulse width out of the plurality of types of synchronization signals received;

determining the type of each synchronization signal included in the received plurality of types of synchronization signals from the ratio of the pulse width of each synchronization signal to the standard time interval;

obtaining the intervals of respective synchronization signals;

redefining, when any of the standard time interval, the combination of types of synchronization signals included in the standard time interval, and the intervals between the respective synchronization signals changes, supplied power values corresponding to the respective types of synchronization signals included in the plurality of types of synchronization signals received; and changing, after a first delay time from a leading edge of a synchronization signal that has been received, the setting of output power of the power supply unit to a supply power value corresponding to a type of the synchronization signal.

This product can be provided having been recorded on an appropriate recording medium, such as a ROM.

BRIEF DESCRIPTION OF THE DRAWINGS

The accompanying drawings, which are incorporated in and constitute a part of the specification, illustrate embodiments of the invention, and together with the general description given above and the detailed description given below, serve to explain the principles of the invention.

DETAILED DESCRIPTION

Figure 1:
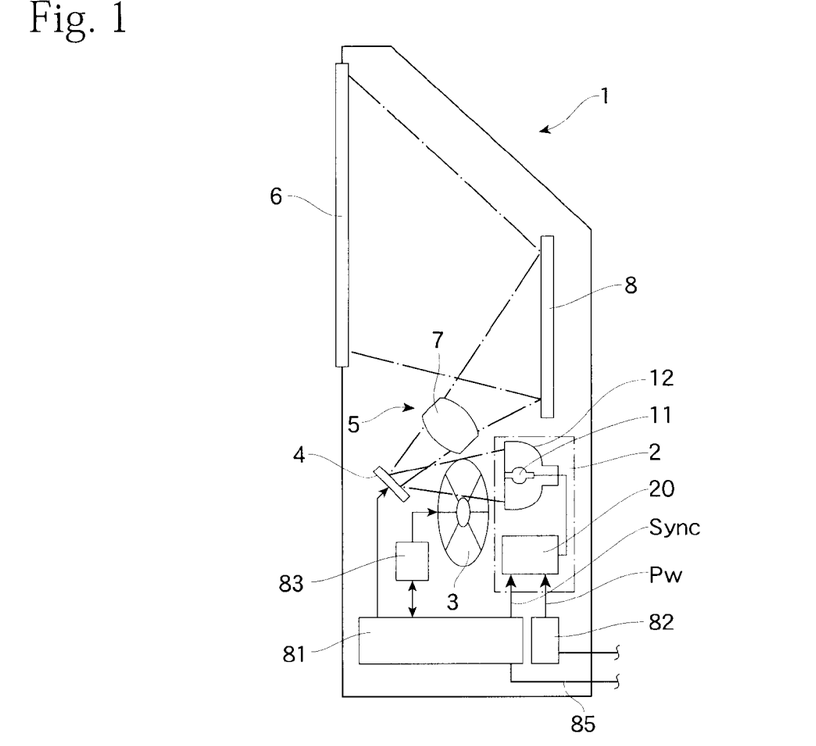
FIG. 1 is a schematic diagram showing an arrangement of a rear projector.

FIG. 1 schematically shows an arrangement of a rear projector as one example of an image output system according to an embodiment of the present invention. The rear projector 1 includes an illumination unit 2 that outputs light, a color filter 3 that subjects the light outputted from the illumination unit 2 to time division to produce light of a plurality of colors, an image generating unit 4 that modulates the light transmitted by the color filter 3, and an optical system 5 for projecting the light modulated by the image generating unit 4 onto an image forming medium. The rear projector 1 also includes a screen 6 that is an image forming medium. The optical system 5 includes a lens system 7 for enlarging and projecting light, which has been modulated by the image generating unit 4, toward the screen 6 and a mirror 8 for reflecting the projecting light toward the screen 6. One example of an image generating unit 4 is a DMD (digital mirror device).

The rear projector 1 also includes a driving control unit 83, a projector control unit 81 and a power source unit 82. The driving control unit 83 controls an actuator, such as a motor, for driving the rotating color filter 3. The projector control unit 81 receives control information 85 including image data for generating images using the image generating unit 4 and controls the entire rear projector 1. The power supply unit 82 generates DC power Pw with a voltage of around 300 to 400V from domestic AC power, for example, and supplies the DC power Pw to the illumination unit 2. The projector control unit 81 supplies a synchronization signal Sync that is synchronized to movement of the color filter 3 to the illumination unit 2.

The illumination unit 2 includes a discharge lamp 11 as a light source, a reflector 12, and a power supply unit 20 that supplies electrical power to the discharge lamp 11 to light the discharge lamp 11. The following description refers to an illumination unit 2 equipped with a discharge lamp 11 that operates on a DC current. Accordingly, the power supply unit 20 according to the present embodiment outputs DC current to the light source 11. However, it is also possible for the power supply unit to supply AC current.

Figure 2:
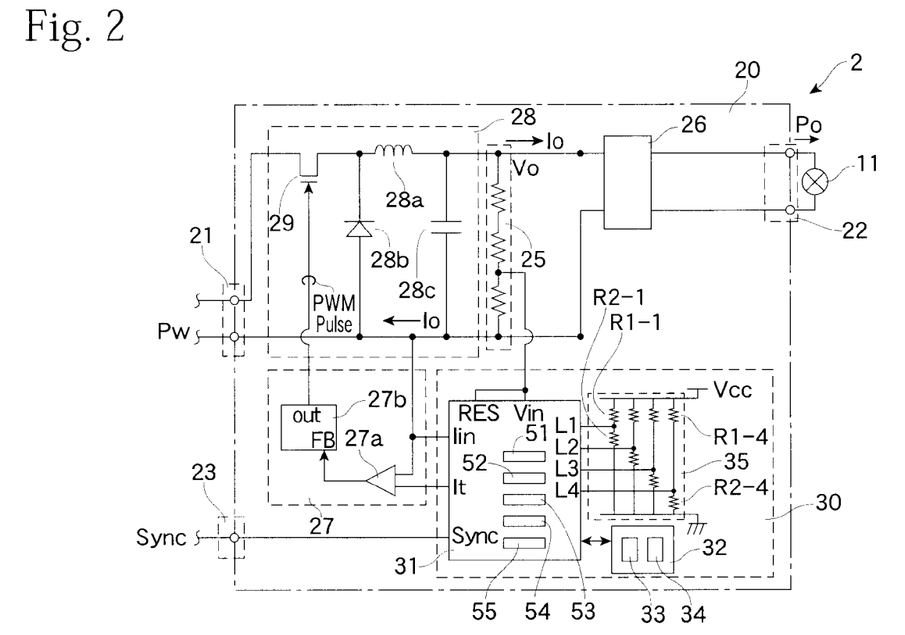
FIG. 2 is a schematic diagram showing the construction of a power supply unit.

FIG. 2 schematically shows the construction of the power supply unit 20. The power supply unit 20 is equipped with a function that controls the intensity of light emitted from the discharge lamp 11 by supplying appropriate power to the HID lamp (discharge lamp) 11 connected to an output side 22 (i.e., an "output interface", "output terminal", or "output connector") of the power supply unit 20 with varying the DC power Pw supplied from the power source unit 82 to the input side 21 (i.e., an "input interface", "input terminal", or "input connector") of the power supply unit 20. The power supply unit 20 is equipped with a back converter (a DC/DC converter) 28 that includes a switching element 29 driven by PWM pulses and varies the power supplied to the discharge lamp 11, a PWM pulse controller 27 that controls the power supplied to the discharge lamp 11 from the power supply unit 20 by supplying PWM pulses to the back converter 28, a control unit 30 that supplies the PWM pulse controller 27 with a set value (a setting) for the power to be controlled using the PWM pulses, and a high voltage generating circuit 26 that supplies a high voltage for causing dielectric breakdown in the discharge lamp 11.

First, when the discharge lamp 11 is lighted, the power supply unit 20 applies a voltage of several kV to the discharge lamp 11 using the high voltage generating circuit 26 to cause dielectric breakdown. After this, the discharge lamp 11 passes through a state of glow discharge to a state of stabilized arc discharge. A typical type of discharge lamp 11 is a high-pressure mercury lamp. The mercury lamp contains a starter rare gas, such as argon, mercury, and a halide therein. Immediately after the move to arc discharge, the principal state is gas discharge and the voltage is low at around 15V to 20V. Before long, as the mercury is vaporized, the mercury vapor pressure rises, and the temperature inside the discharge lamp and the voltage also rise. Via this initial period, a stabilized lighted state is reached. When the discharge lamp 11 has been lighted, the power supply unit 20 switches to constant power control via constant current control. The back converter 28 is a step-down converter that outputs a lower voltage Vo than the input voltage. A typical back converter 28 includes a switching element 29 used for chopping, and also a choke coil 28a, a flywheel diode 28b, and a smoothing capacitor 28c.

The PWM pulse controller 27 outputs PWM pulses with pulse widths that change based on a feedback signal FB. The control unit 30 detects the output voltage Vo via a voltage detecting circuit 25 provided on the output side of the back converter 28. The control unit 30 outputs a target current It that corresponds to a power set in advance. Accordingly, the control unit 30 outputs the target current It to control the output of the power supply unit 20. The PWM pulse controller 27 includes a comparator 27a that generates the feedback signal FB and a pulse generator 27b that outputs PWM pulses with a frequency f. The comparator 27a compares the target current It supplied from the control unit 30 and a current Io flowing through the back converter 28 and generates the feedback signal FB. The pulse generator 27b appropriately controls the duty by changing the respective pulse widths of the PWM pulses to control the current Io outputted from the back converter 28.

Accordingly, the output power Po of the power supply unit 20 can be controlled by the control unit 30 changing the target current It. Normally, a constant power, which is suited to lighting the discharge lamp 11 in a steady state, is supplied from the power supply unit 20 by the back converter 28. With the power supply unit 20 according to the present embodiment, in a short term or period, the output power (i.e., "supplied power") to the discharge lamp 11 is varied in synchronization with the synchronization signal Sync, but in a long term or period, the power (average power) supplied to the discharge lamp 11 in periods (cycles) of an appropriate length is constant. That is, according to the power supply unit 20, if in a state where the output voltage Vo is constant, the control unit 30 changes the target current It so that the current (supplied current) Io supplied from the power supply unit 20 to the discharge lamp 11 varies in short periods in synchronization with the synchronization signal Sync.

Note that the power supply unit 20 is described for a case where in the steady state, the supplied current (i.e., "lamp current") Io corresponding to the output power Po is equal to the output current Io controlled by the back converter 28. In this example, the target current It is provided as a signal whose height changes in a pulse-like manner in synchronization with the synchronization signal Sync. Therefore, in the following description the magnitude of the target current is referred to as the "current control pulse height It". The control unit 30 controls the current control pulse height It so that the current (average current) supplied to the discharge lamp 11 is constant within periods (cycles) of an appropriate length.

The power supply unit 20 is equipped with the input connector (or "input interface" or "input terminal") 23 for receiving the synchronization signal Sync. The control unit 30 includes a control IC (processor) 31 equipped with a function for performing power control and a ROM 32 in which a program (program product, firmware) 33 for the control IC 31 is stored. By loading the program 33, the control IC 31 acts as a number of functional units including the functional units described below. An LUT (look up table) 34 including control parameters is also stored in the ROM 32. A plurality of types of synchronization signal Sync are inputted into the control IC 31 and the current control pulse height It is variably controlled in accordance with the type of synchronization signal Sync. Note that the expression "variably controlled" includes control to maintain the same level. A resistor group 35 for determining the current control pulse height It in accordance with the type of synchronization signal Sync is connected to the control IC 31.

Figure 3:
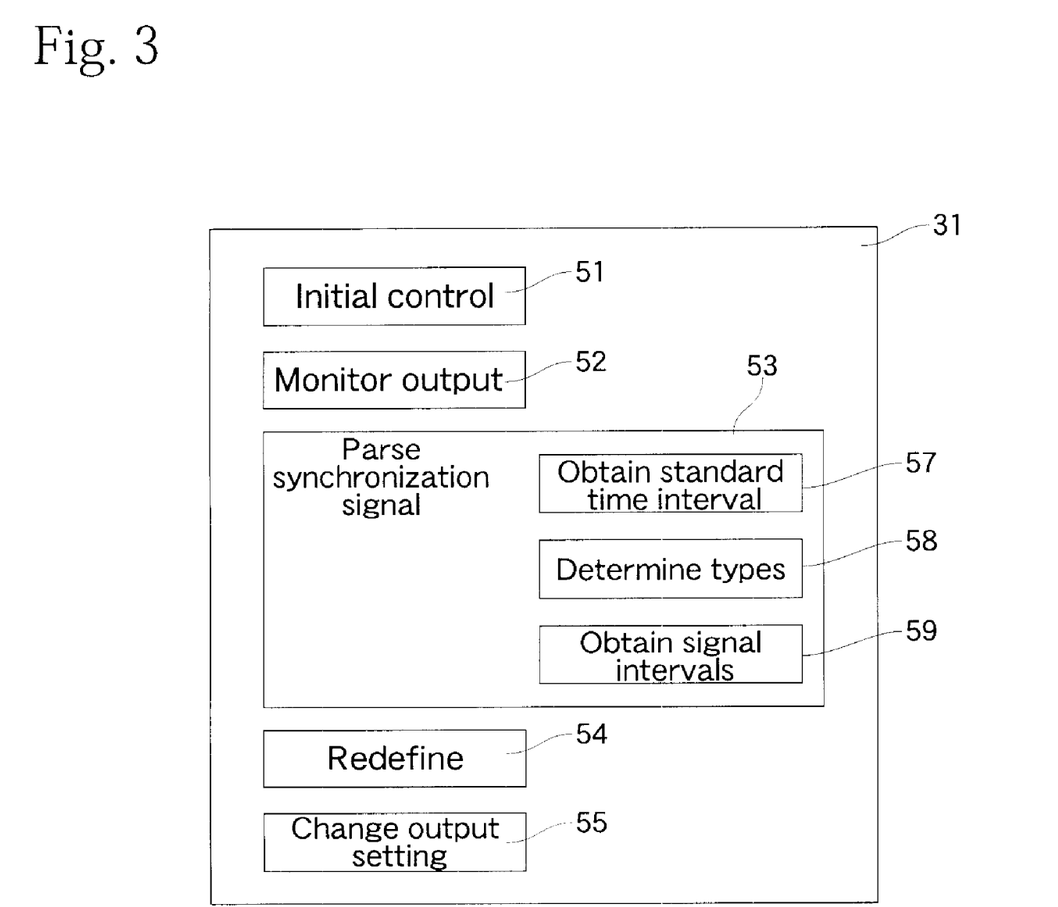
FIG. 3 is a block diagram showing the functions provided by a control IC.

FIG. 3 shows a number of the functional units realized by the control IC 31. The control IC 31 includes an initial control function (functional unit of initial control) 51, an output monitor function (functional unit of output monitoring) 52, a synchronization signal parsing function (functional unit of parsing synchronization signals) 53, a redefining function (functional unit of redefining) 54, and an output setting changing function (functional unit of changing setting of output power) 55. Those functions or functional units are realized by coordinated operation of the control IC 31 itself, other software resources and other hardware resources included in the control unit 30, such as the ROM 32 and a RAM (not shown).

The functional unit of initial control 51 reads parameters for lighting the discharge lamp 11, generates a high voltage to light the discharge lamp 11, and carries out control until the discharge state is stabilized. The functional unit of output monitoring 52 monitors the output power supplied from the power supply unit 20 to the discharge lamp 11, that is, the output voltage Vo and the output current Io, and controls the current control pulse height It so as to carry out constant power control in units of an appropriate time period. The functional unit of parsing synchronization signals 53 judges the type, cycle (interval), and the like of the synchronization signals Sync supplied from the projector control unit 81 and analyzes information transmitted from the projector control unit 81 with the synchronization signals Sync.

The power supply unit 20 according to the present embodiment is capable of receiving four types of synchronization signals Sync numbered S1 to S4, with the respective synchronization signal types S1 to S4 having different pulse widths Ts1 to Ts4. Hereinafter, the expression "synchronization signal types S1 to S4" or "synchronization signals S1 to S4" is used when referring to the respective types of synchronization signal and the expression "synchronization signals Sync" is used when referring to synchronization signals in general. The synchronization signal S4 has the longest pulse width Ts4 and is the standard synchronization signal. The number of types of synchronization signals is not limited four as in this case, it is possible to use three types or below, or conversely five types or above for controlling the output power.

To distinguish between the plurality of synchronization signal types S1 to S4, the functional unit of parsing synchronization signals 53 includes a obtaining function (functional unit) 57 of measuring and obtaining a standard time interval (i.e., a standard cycle) Tb from the cycle of the synchronization signal S4 that is the standard type and has the longest pulse width out of the received plurality of synchronization signal types S1 to S4, a determining function (functional unit) 58 of determining the respective synchronization signal types S1 to S4 from the ratios of the pulse widths Ts1 to Ts4 of the synchronization signal types S1 to S4 included in the received synchronization signal Sync to the standard time interval Tb, and a function (functional unit) 59 of measuring and obtaining the intervals Cjk (where j, and k are integers) between the respective synchronization signals Sync. An interval Cjk of the synchronization signal Sync is the time period from a type j synchronization signal Sync until the next synchronization signal Sync, and if the number n of type j synchronization signals Sync are included in the standard time interval Tb, the interval Cjk shows the intervals Cj1 to Cjn or any one of those intervals.

When the standard time interval Tb, the combination of the synchronization signal types S1 to S4 included in the standard time interval Tb, or the intervals Cjk of the respective synchronization signals changes, the functional unit 54 redefines the supplied power values corresponding to the respective synchronization signal types S1 to S4 included in the received plurality of synchronization signal types. Here, it is always necessary for the power supply unit 20 to receive the synchronization signal S4 that is the standard type. However, there is no need for every type out of the other synchronization signal types S1 to S3 to be included in the standard time interval Tb, and the same type of synchronization signal may be included a plurality of times in the standard time interval Tb.

The power supply values corresponding to the respective synchronization signal types S1 to S4 are selected and outputted in the present embodiment from the control unit 30 as the supply current values, that are, the current control pulse heights It. Hereinafter, the height of the control pulses to be outputted as the setting value that is a current control pulse height It, corresponding to the synchronization signal types S1 to S4 are referred to as the "pulse heights L1 to L4". These pulse heights L1 to L4 are initially provided as information on ratios (for example, percentages) corresponding to the synchronization signal types S1 to S4 and are relative values showing the power supplied to the discharge lamp 11 (i.e., supplied current) corresponding to the synchronization signal types S1 to S4. The redefining functional unit 54 defines or adjusts the actual pulse heights (supplied currents, supply current values) L1 to L4 corresponding to the synchronization signal types S1 to S4 so that the total power during the standard time interval Tb is constant.

More specifically, when the condition of redefining is satisfied, the redefining function 54 calculates the average current Iadd of the standard time interval Tb according to Equation (1) below.

$$Iadd = \Sigma(Lj \times Cjk)/Tb \quad (1)$$

Here, in the present embodiment, j which represents the type is 1 to 4, and k is 1 to n (where n is an integer). In addition, the redefining function 54 adjusts the pulse heights L1 to L4 according to Equation (2) below with the previous average current Ityp that is the average current before the redefining.

$$Lj = Lj \times (Ityp/Iadd) \quad (2)$$

Here, in the present embodiment, j which represents the type is 1 to 4.

By changing L1 to L4 in this way, the total of the current during the standard time interval Tb will become constant, so that constant current control can be carried out over the discharge lamp 11 in units or cycles of the standard time interval Tb or longer.

In this way, the functional unit of redefining 54 includes finding the total Iadd during the standard time interval Tb (or the average during the standard time interval Tb in the example described above) of the products of the supplied power ratios L1 to L4 corresponding to the respective synchronization signal types S1 to S4 and the intervals Cjk of the respective synchronization signals and calculating the supplied currents (i.e., the pulse heights) L1 to L4 corresponding to the respective synchronization signal types S1 to S4 so that the total (or the average for the standard time interval Tb) becomes constant (in this case, the total Iadd is equal to the previous total Ityp).

A first delay time T0 after the leading edge of a synchronization signal Sync, the output setting changing functional unit 55 changes the setting value (i.e., the current control pulse height) It of the output power of the power supply unit 20 to a pulse height (one of L1 to L4) that indicates the supply current value corresponding to the synchronization signal type (one of S1 to S4). The functional unit 55 also includes a function for varying the first delay time T0 in proportion to the standard time interval Tb.

Figure 4:
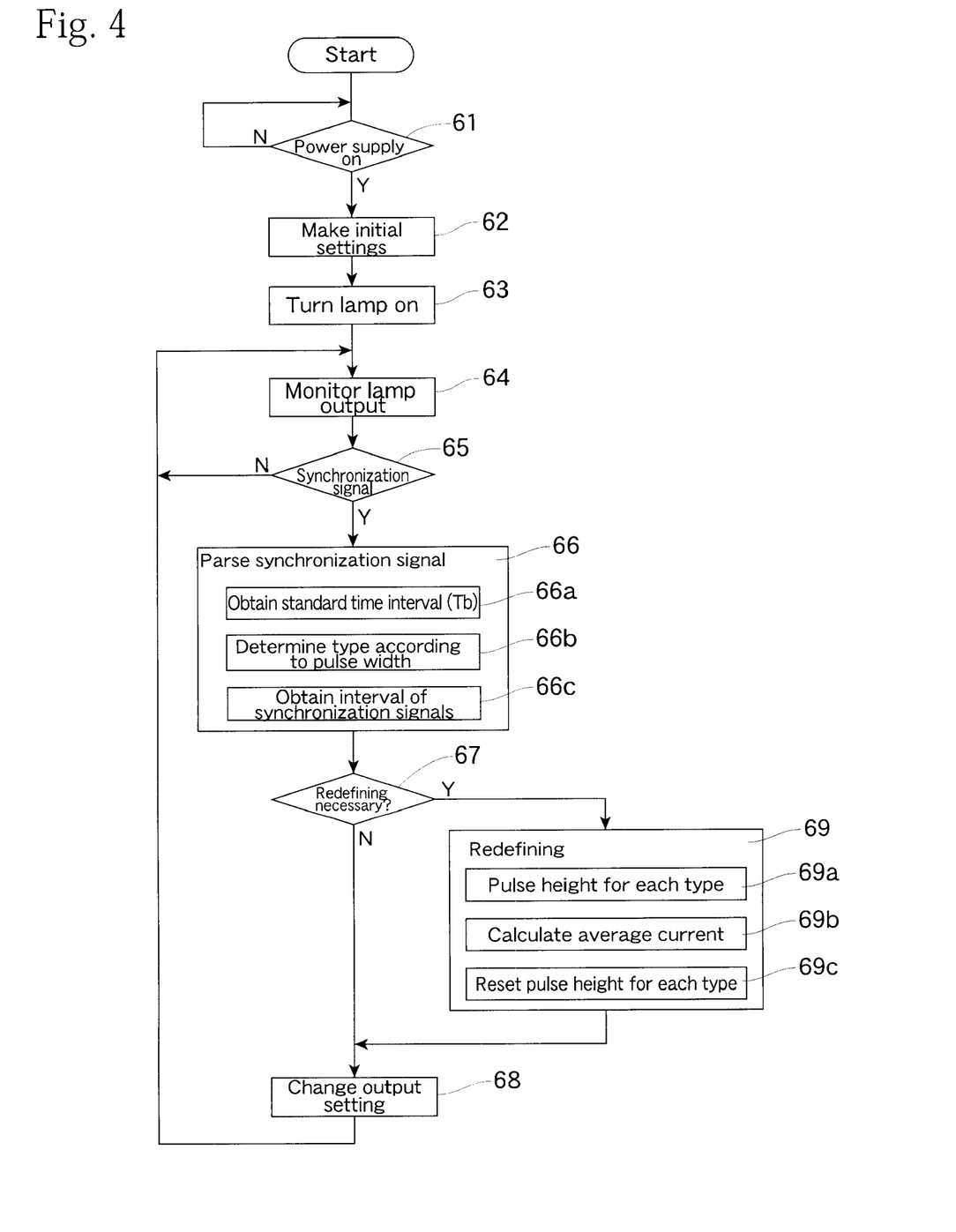
FIG. 4 is a flowchart showing a method of controlling a power supply unit.

FIG. 4 is a flowchart showing an operation of the control unit 30 for controlling the power supplied to the discharge lamp 11 by the power supply unit 20. In step 61 when the DC power Pw is supplied to the input side of the power supply unit 20, the voltage of such power resets the control IC 31 and the process for lighting the discharge lamp 11 is commenced. First, in step 62, the initial control functional unit 51 makes initial settings, such as by reading parameters. With the control IC 31, parameters for determining the pulse heights L1 to L4 corresponding to the synchronization signal types S1 to S4 are read from resistance values set in the resistor group 35 connected to the control IC 31. The pulse heights L1 to L4 are indicated by combinations of a resistance R1 connected to a high voltage (5V) (more specifically, resistors R1-1 to R1-4) and a resistance R2 connected to ground (more specifically, resistors R2-1 to R2-4) as shown in FIG. 2.

Figure 5A:
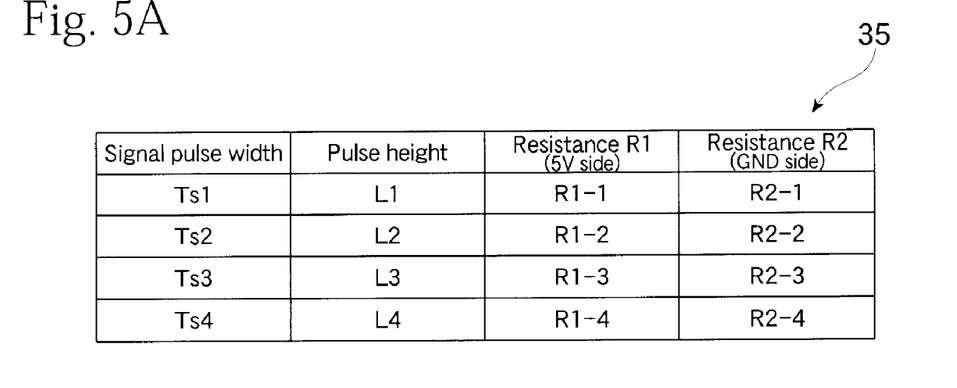
FIG. 5A is a diagram showing an example setting of a resistor group that indicates pulse heights L1 to L4 and FIG. 5B is a diagram showing an example LUT including settings of the resistor group and pulse heights.
Figure 5B:
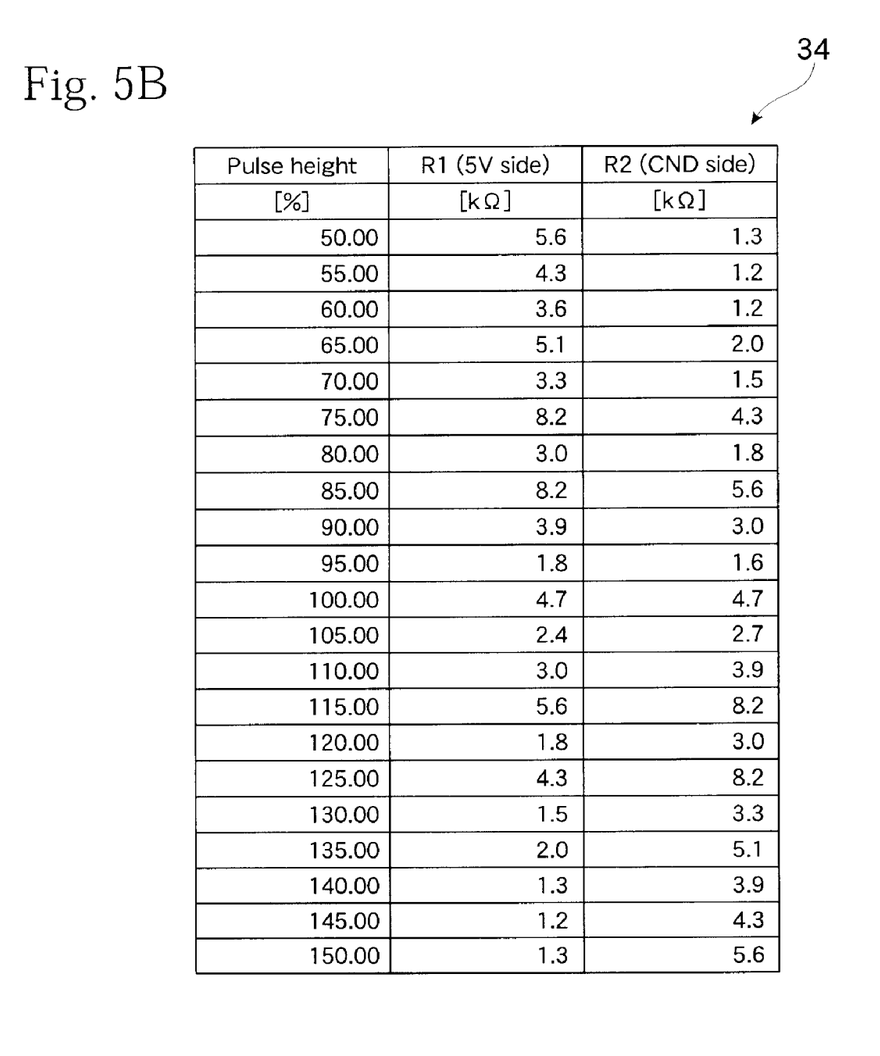

FIG. 5A shows example combinations for the resistor group 35. In addition, as shown in FIG. 5B, the pulse heights indicated by combinations of the resistance R1 on the high voltage side and the resistance R2 on the ground side are stored as ratios (i.e., percentages) in the LUT 34 in the ROM 32. The control IC 31 detects the combination of the resistances R1 and R2 indicating one of the pulse heights L1 to L4 corresponding to the one of pulse widths of the synchronization signal Sync and reads the ratio of the pulse height L1 to L4 determined by such combination. Accordingly, using a combination of resistances in the resistor group 35, the user of the power supply unit 20 can freely select the ratios of the pulse heights L1 to L4 within the ranges set in the LUT 34.

The respective pulse heights L1 to L4 may also be defined directly from or in proportion to the pulse widths Ts1 to Ts4 of the synchronization signal types S1 to S4. However, with this method, the pulse height L4 corresponding to the synchronization signal S4 with the longest pulse width used for defining the standard time interval Tb will definitely be the largest, which narrows the selection range for the pulse heights. By making the definition of the pulse heights L1 to L4 indirectly from the pulse widths Ts1 to Ts4 of the synchronization signal types S1 to S4 using the resistor group 35 and the LUT 34, it is possible to increase the variety of selecting the pulse heights L1 to L4. Therefore, it is possible to give the pulse widths Ts1 to Ts4 of the synchronization signals Sync a different meaning or function, such as designating the standard time interval. The pulse heights L1 to L4 may all be different or may include the same value. For example, since the synchronization signal S4 designates the standard time interval Tb, to define the same output values as the pulse height L4 during the standard time interval Tb, any of the pulse heights L1 to L3 needs to be set at the same value as the pulse height L4.

The method of indirectly deciding the pulse heights L1 to L4 is not limited to using the combination of the resistor group 35 and the LUT 34. By rewriting the LUT 34 stored in the ROM 32, it is possible to decide the pulse heights L1 to L4 without designating values via the resistor group 35. Alternatively, in place of the resistor group 35, it is possible to use another selection means, such as DIP switches.

In step 63, the initial control functional unit 51, further, supplies a high voltage to the discharge lamp 11 to light the discharge lamp 11. Once the discharge lamp 11 is lit, in step 64, the output monitoring functional unit 52 monitors the output voltage (supplied voltage) Vo and output current (supplied current) Io supplied to the discharge lamp 11 and carries out constant power control. In step 65, the synchronization signal parsing functional unit 53 determines whether a synchronization signal Sync has been inputted. If no synchronization signal Sync has been received, the control IC 31 uses the output monitoring functional unit 52 to control the current control pulse height It so that the power supplied from the power supply unit 20 to the discharge lamp 11 is constant.

When a synchronization signal Sync has been received, in step 66 the parsing functional unit 53 determines the type of synchronization signal Sync and obtains the time interval Cjk from the previous synchronization signal Sync. If there is no change in the combination of the synchronization signal Sync or the interval Cjk compared to the previous standard time interval (standard cycle) Tb, in step 67 it is determined that there is no need to reset or redefine the pulse heights L1 to L4. Accordingly, in step 68, the output setting changing functional unit 55 changes the current control pulse height It to the pulse height (one of L1 to L4) corresponding to the type (one of S1 to S4) of the inputted synchronization signal Sync the time T0 after the leading edge (a rising edge or falling edge) of the synchronization signal Sync.

Figure 6A:
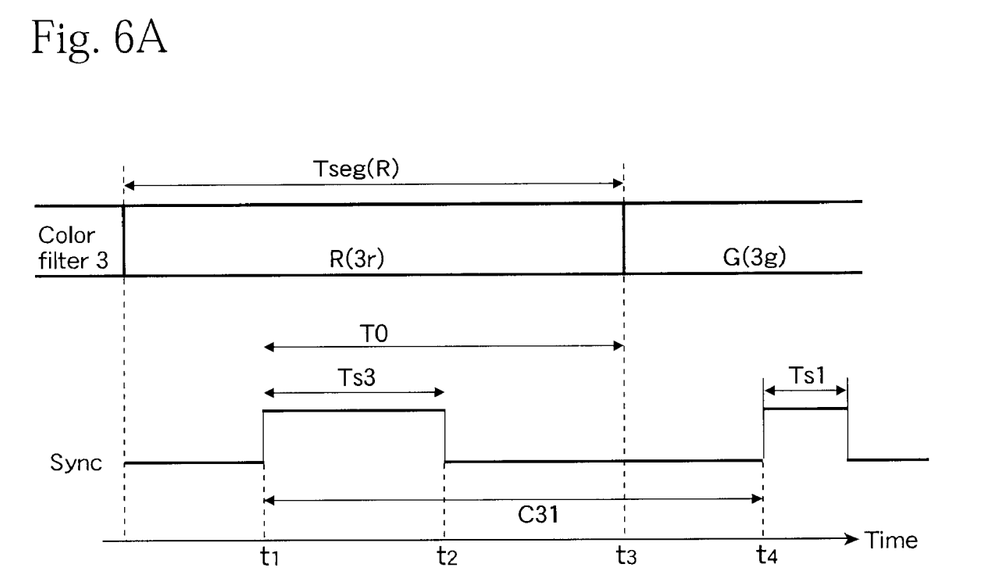
FIG. 6A is a diagram showing a relationship for pulse widths of a synchronization signal and FIG. 6B is a diagram showing one example of the pulse widths for the synchronization signal.

FIG. 6A shows the relationship between the synchronization signal Sync, the pulse width Tsj (where j is an integer), the interval Cjk, the delay time T0, and the timing of the change between the segments 3r and 3g of the color filter 3. The synchronization signal Sync, for example, the synchronization signal S3, is received at the time t1 while light from the illumination unit 2 is incident on a red segment 3r of the color filter 3. The parsing functional unit 53 obtains the pulse width Ts3 from the time t1 of the rise (i.e., leading edge) of the synchronization signal S3 and the time t2 of the fall. At the time t3, which is the period T0 after the time t1, the changing functional unit 55 changes the output setting that is the current control pulse height It to the pulse height L3 corresponding to the synchronization signal S3. The time t3 is the timing of the change from the red segment 3r to a green segment 3g on the color filter 3. Accordingly, in the rear projector 1 shown in FIG. 1, the image generating unit 4 can be illuminated (i.e., lit) with green light of a different intensity to the red light. In addition, when the next synchronization signal Sync, for example, the synchronization signal S1, is received at time t4, the interval C31 from time t1 to time t4 is obtained by the parsing functional unit 53.

Figure 6B:
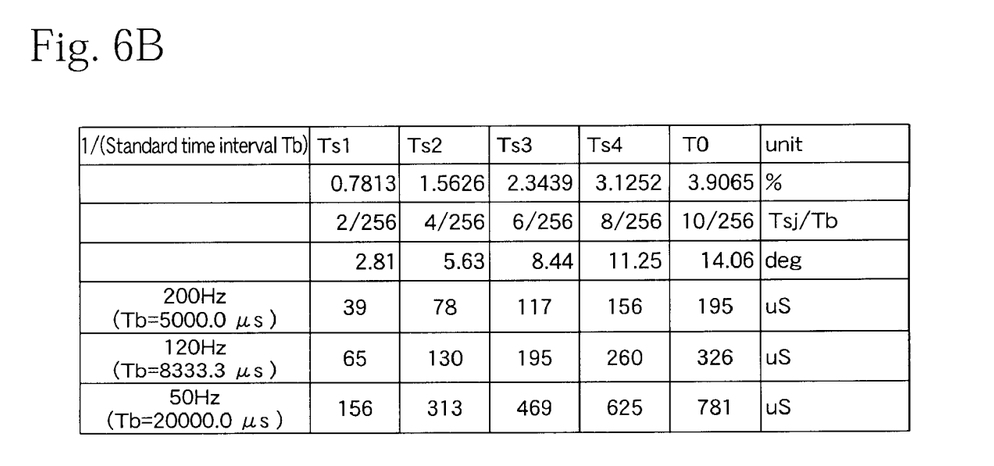

FIG. 6B shows how the pulse widths Ts1 to Ts4 of the synchronization signal types S1 to S4 and the delay time T0 are determined and defined based on the standard time interval Tb. These parameters are also stored in the ROM 32. In the present embodiment, the shortest pulse width Ts1 is 2/256 of the standard time interval Tb, the pulse width Ts2 is 4/256 of the standard time interval Tb, the pulse width Ts3 is 6/256 of the standard time interval Tb, the pulse width Ts4 is 8/256 of the standard time interval Tb, and the delay time T0 is set at 10/256 of the standard time interval Tb. As shown, the synchronization signal types S1 to S4 are determined based on the ratio of the pulse widths Ts1 to Ts4 to the standard time interval Tb, and the pulse widths Ts1 to Ts4 vary according to the standard time interval Tb.

As examples, the standard time interval Tb is the rotation period of the color wheel (color filter) 3 or a cycle for which a series of segments is repeated. For a system where the color wheel 3 rotates at high speed and images are controlled at high frequency, the standard time interval Tb is short, and the power supply unit 20 can be controlled according to the synchronization signals Sync with a shorter synchronization period (cycle) and relatively high-resolution pulse width. On the other hand, for a system where images are controlled at low frequency, such as systems where the color wheel 3 rotates at low speed, the standard time interval Tb is longer, and the power supply unit 20 can be controlled according to the synchronization signals Sync with longer, low-resolution pulse widths.

Since the pulse widths Ts1 to Ts4 are determined using values relative to the standard time interval Tb, there is no need for both the power supply unit 20 and the projector control unit 81 to store and manage the absolute values of the pulse widths Ts1 to Ts4. This means that there is no need to use the same clock signal to the power supply unit 20 and the projector control unit 81 and the precision of the clock signal dose not become a major problem. Therefore, the power supply unit 20 and the projector control unit 81 can be developed and designed independently. In addition, in this example, the control unit 30 of the power supply unit 20 can determine the type of synchronization signal using a counter, timer, or the like with a resolution of around 256 values (8 bits), which means that the type of synchronization signal can be determined with high precision using a simple construction.

In step 66 that parses the synchronization signal, first, in a step 66a, the standard time interval obtaining functional unit 57 identifies the synchronization signal S4 with the longest pulse width Ts4 and sets the cycle of the synchronization signal S4 as the standard time interval Tb. In the initial state, the standard time interval Tb is unclear and therefore the pulse width Ts4 will also be unclear, which means it will not be possible to determine the synchronization signal type S4 from the received synchronization signals Sync. Accordingly, the functional unit 57 compares the pulse widths of the received synchronization signals Sync for at least a base time period (a base period) during which the longest pulse signal will be received twice and obtains the standard time interval Tb when the synchronization signal Sync with the longest pulse width has been received again. The functional unit 57 constantly measures the interval between the longest synchronization signals as the standard time interval Tb. If the standard time interval Tb changes, if the order of the synchronization signal types S1 to S4 changes, or if any of the intervals Cjk of the synchronization signals changes, the obtaining functional unit 57 will treat the standard time interval Tb as being unclear and will measure and obtain the standard time interval Tb again.

Once the standard time interval Tb is known, in step 66b, the determining functional unit 58 determines the synchronization signal types S1 to S4 from the pulse widths Ts1 to Ts4 of the respective synchronization signals Sync. In addition, in step 66c, the signal interval obtaining functional unit 59 measures the intervals Cjk of the respective synchronization signals Sync. In step 67, if any of the standard time interval Tb, the order of the synchronization signal types S1 to S4, and the intervals Cjk of the synchronization signal has changed, the redefining functional unit 54 judges that redefining is required, and resets the pulse heights L1 to L4 in step 69.

In step 69a, the redefining functional unit 54 obtains the pulse heights L1 to L4, which correspond to the synchronization signal types S1 to S4 included in the standard time interval Tb, and the intervals Cjk of the synchronization signals. The synchronization signal S4 will definitely be included, but the other synchronization signal types S1 to S3 may or may not be included in the standard time interval Tb. In step 69b, the redefining functional unit 54 also calculates the average current Iadd using Equation (1) given earlier. In step 69c, the redefining functional unit 54 resets the pulse heights L1 to L4 to be outputted as the current control pulse height It during the next standard time interval Tb using Equation (2) given earlier.

The method of controlling of the power supply unit 20 that is performed by the operation of the control IC 31 shown in FIG. 4 is realized by the program product such as the firmware 33 stored in the ROM 32. The program product 33 can be provided having been recorded on a suitable recording medium such as a CD-ROM and installed in the ROM. In an environment where it is possible to download the firmware 33 from a computer network such as the Internet, the firmware 33 can be provided via the computer network.

Figure 7A:
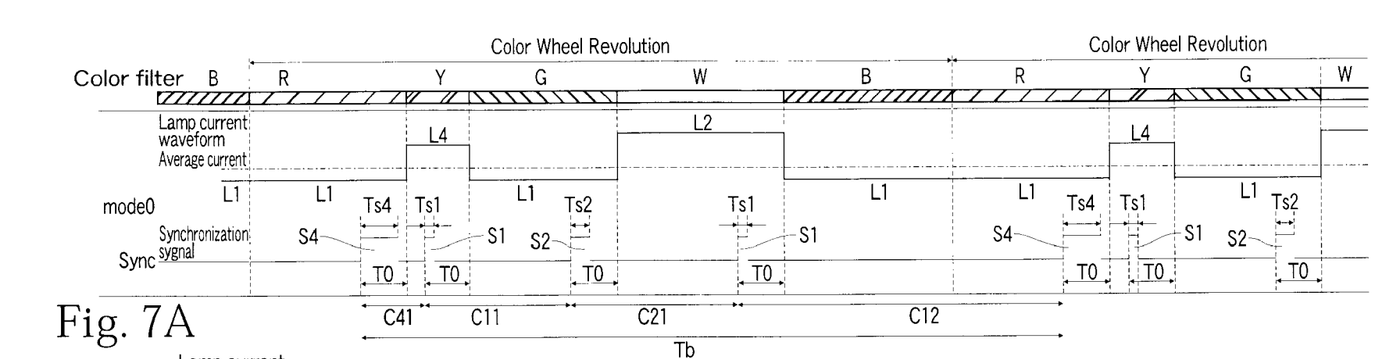
FIGS. 7A to 7C show how the lamp current is changed using the synchronization signal Sync.
Figure 7B:
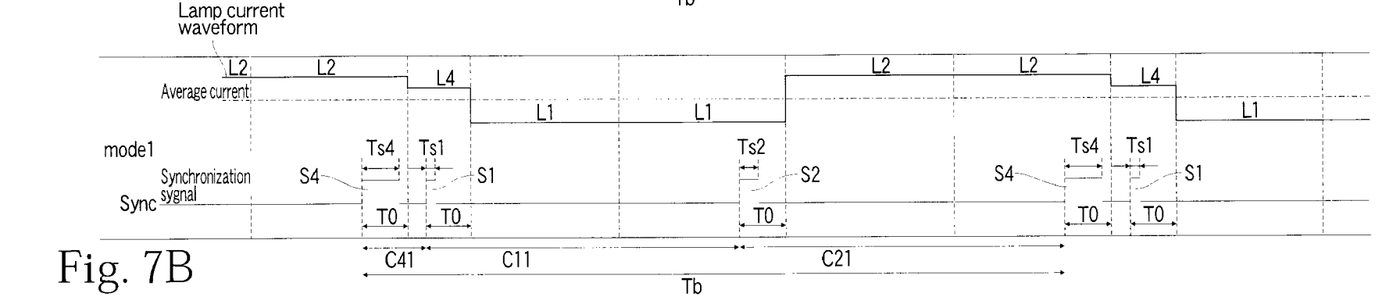
Figure 7C:
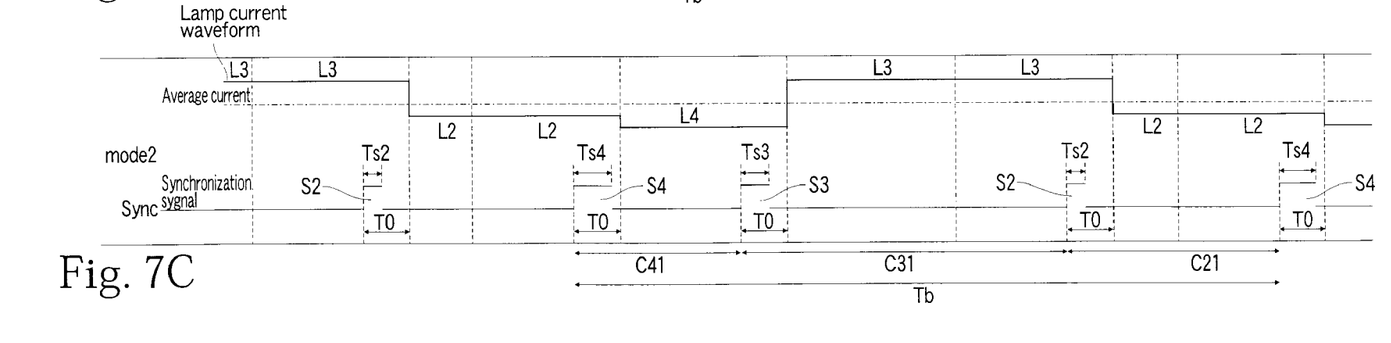

FIGS. 7A to 7C show an example where the control of the power supply unit 20 is adapted to a color filter 3 equipped with red (R), yellow (Y), green (G), white (W), and blue (B) segments. The color filter 3 is rotated at 120 Hz and the power supply unit 20 controls the lamp current using the synchronization signals Sync so as to control the intensity of the light incident on the respective segments of the color filter 3. In mode 0 shown in FIG. 7A, the synchronization signals S4, S1, S2, and S1 are included in the standard time interval Tb. In synchronization with the synchronization signals S4, S1, S2, and S1, or in more detail, at timings when the segment changes the time T0 after the respective synchronization signals, the pulse heights L4, L1, L2, and L1 are outputted as the current control pulse heights It from the control unit 30 of the power supply unit 20. In other words, the current control pulse height It changes to the pulse heights L4, L1, L2, and L1. Note that light of an intensity corresponding to the same supplied current (i.e., the same pulse height) L1 is incident on both the blue (B) segment and the red (R) segment and therefore a synchronization signal corresponding to the red (R) segment is not received.

Figure 8:
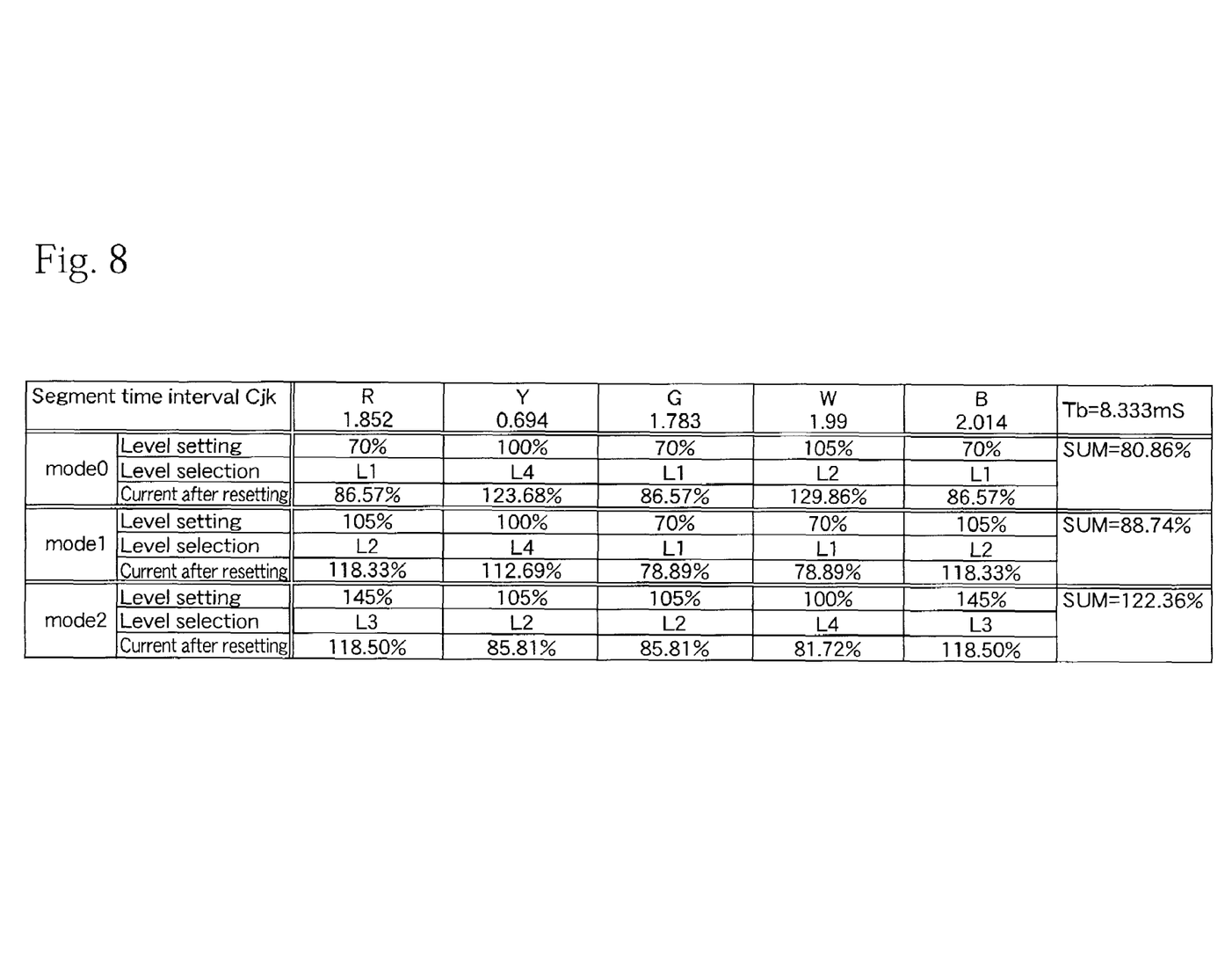
FIG. 8 shows how the pulse heights L1 to L4 are redefined.

FIG. 8 shows the result of redefining the pulse heights L4, L1, and L2 of mode 0. The pulse heights L4, L1, and L2 are initially set at 100%, 70%, and 105% respectively by the resistor group 35. In accordance with Equation (1), the average current Iadd is calculated from the products of the pulse heights L4, L1, and L2 and the intervals C41, C11, C21, and C12 of the synchronization signals, as shown by Equation (11) below. Here, the time interval C12 is the total of the time for which light is inputted or incident on the blue (B) segment and the red (R) segment, and the standard (previous) average current Ityp is 100%.

$$Iadd=(L1 \times (C11+C12)+L2 \times C21+L4 \times C41)/Tb=80.86 \quad (11)$$

The redefining functional unit 54 multiplies the respective pulse heights L4, L1, and L2 by (100/80.86) to set the current values (pulse heights) L4, L1, and L2 at 123.68%, 86.57%, and 129.86% so that the average current for the standard time interval Tb becomes 100%.

While the power supply unit 20 is controlling the output current Io as shown in FIG. 7A, a combination of synchronization signals Sync for mode 1 shown in FIG. 7B is received. Since the combination of synchronization signals has changed, the power supply unit 20 uses the parsing function 53 and the redefining functional unit 54 of the control unit 30 to obtain the standard time interval Tb, to determine the types of synchronization signals, to obtain the intervals Cjk of the synchronization signals, and to then redefine the pulse heights L1 to L4. To reset the pulse heights L1 to L4, in many cases at least two cycles (two standard cycles) will be required. As shown in FIG. 8, in mode 1, the pulse heights L4, L1, and L2 are included in the standard time interval Tb and the average current Iadd becomes 88.74%. Accordingly, the redefining functional unit 54 adjusts the initial sets of 100%, 70%, and 105% of the pulse heights L4, L1, and L2 to 112.69%, 78.89%, and 118.33%.

This is also the case in mode 2 shown in FIG. 7C. In mode 2, the pulse heights L4, L3, and L2 are included in the standard time interval Tb and the average current Iadd becomes 122.36. Accordingly, the redefining functional unit 54 adjusts the initial sets of 100%, 145%, and 105% of the pulse heights L4, L3, and L2 at 81.72%, 118.5%, and 85.81%.

Figure 9:
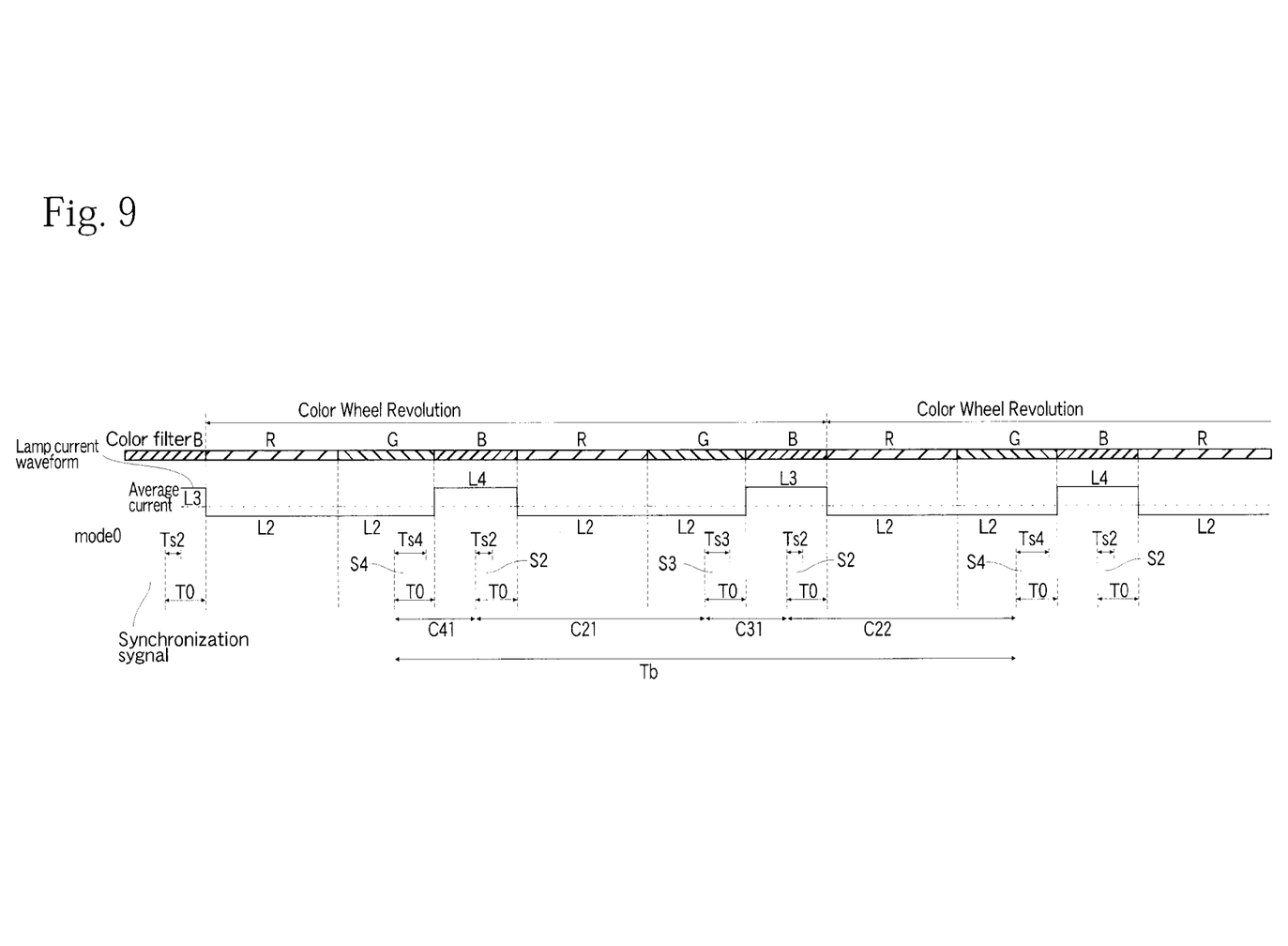
FIG. 9 shows how the lamp current is changed using the synchronization signals Sync for different color filters.

FIG. 9 shows an example where the power supply unit 20 is applied to a color filter 3 equipped with red (R), green (G), and blue (B) segments. In this example also, the power supply unit 20 controls the lamp current using the synchronization signal Sync to control the intensity of light incident on the respective segments of the color filter 3. In mode 0 shown in FIG. 9, the synchronization signals S4, S2, S3, and S2 are included in the standard time interval Tb. In synchronization with the synchronization signals S4, S2, S3, and S2, or in more detail, at timings when the segment changes the time T0 after the respective synchronization signals, the pulse heights L4, L3, and L2 are outputted as the current control pulse heights It from the control unit 30 of the power supply unit 20. Two RGB sequences are included in the standard time interval Tb, and the intensity of light incident on the blue B segment in the first sequence and the intensity of light incident on the blue B segment in the next sequence are controlled separately. The power supply unit 20 can also control three or more sequences included in the standard time interval Tb.

In this way, by receiving the synchronization signals Sync of different types, the power supply unit 20 can variably control the lamp current at timings that are synchronized with the synchronization signals Sync. This means that by using the power supply unit 20, by merely supplying appropriate synchronization signals Sync, it is possible to carry out control over the discharge lamp 11 so that light of desired intensities is incident at appropriate timings on a variety of types of color filter 3. Accordingly, the power supply unit 20 has wide applicability and can be easily combined with a variety of color filters (color wheels), which means that products, such as the illumination unit 2 and the projector 1, of a variety of specifications can be placed on the market at low cost and in a short time.

In addition, by changing the timings and types of the synchronization signals Sync, the power supply unit 20 can dynamically control the intensity of the light emitted from the discharge lamp 11 and the timing at which the intensity is changed. This means that by dynamically controlling or reconfiguring the settings of the illumination unit 2, it is possible to dynamically change the tone of the images outputted onto the screen 6 of the projector 1 in accordance with the user's preference and/or the type of images being displayed. Accordingly, it is possible to eliminate or reduce the load for adjusting image quality, which includes adjusting tone, from the control or image data of the image generating unit 4, and therefore it is possible to output images of even higher image quality using the image generating unit 4.

Note that although an embodiment of the present invention has been described above based on a power supply unit that includes a DC/DC converter and outputs DC power, it is also possible to apply the present invention to a power supply unit that outputs AC power. Also, the present invention is not limited to a power supply unit for a discharge lamp and can be applied to a power supply unit that controls the output (intensity) of other types of lamps, such as white LEDs. In the above explanation, a power supply unit that uses the back converter 28 for carrying out power control has been described as one example, with the back converter 28 being controlled using PWM pulses. However, such control is not limited to using PWM pulses and it is possible to carry out frequency control or another control method. Although four types of synchronization signals Sync have been described as an example, the number of synchronization signal types may be three or below or five or above. In addition, the image output system is not limited to a rear projector and includes an image output system that displays images of different colors by time division, such as a front projector that displays images on a screen or an image forming medium aside from a screen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply unit capable of varying power supplied to a light source at timings determined by synchronization signals, the power supply unit comprising:
   an interface that receives a plurality of types of synchronization signals with different pulse widths; and
   a control unit that changes a setting of output power supplied by the power supply unit in accordance with the pulse widths of the plurality of types of synchronization signals that have been received;
   wherein the control unit includes:
   obtaining a standard time interval from a cycle of a standard type of synchronization signal that has a longest pulse width out of the plurality of types of synchronization signals received;
   determining type of each synchronization signal included in the plurality of types of synchronization signals received from ratio of pulse width of each synchronization signal to the standard time interval;
   obtaining intervals of respective synchronization signals received;
   redefining, when any of the standard time interval, combination of types of synchronization signals included in the standard time interval, and intervals between the respective synchronization signals changes, supply power values corresponding to respective types of synchronization signals included in the plurality of types of synchronization signals received; and
   changing, after a first delay time from a leading edge of a synchronization signal received, the setting of output power of the power supply unit to a supply power value corresponding to a type of the synchronization signal.

2. The power supply unit according to claim 1, wherein the redefining supply power values includes finding a total, for the standard time interval, of products of supply power ratios corresponding to the respective types of synchronization signals and the intervals of the respective synchronization signals, and calculating the supply power values corresponding to the respective types of synchronization signals so that the total becomes constant.

3. The power supply unit according to claim 1, wherein the control unit further includes setting the first delay time in proportion to the standard time interval.

4. An illumination unit, comprising:
   a power supply unit according to claim 1; and
   a light source that receives power supplied by the power supply unit.

5. An image output system, comprising:
   an illumination unit according to claim 4;
   a color filter that carries out time division to divide light outputted from the illumination unit to light of a plurality of colors;
   an image generating unit that modulates light that has been transmitted by the color filter; and
   an optical system that projects the light modulated by the image generating unit onto an image forming medium.

6. A method of controlling a power supply unit capable of varying power supplied to a light source at timings determined by synchronization signals, the method comprising:
   receiving, via an interface, a plurality of types of synchronization signals with different pulse widths; and
   changing, by a control unit, a setting of output power of the power supply unit in accordance with the pulse widths of the plurality of types of synchronization signals that have been received;
   wherein the changing the setting of output power includes:
   obtaining a standard time interval from a cycle of a standard type of synchronization signal that has a longest pulse width out of the plurality of types of synchronization signals received;
   determining type of each synchronization signal included in the plurality of types of synchronization signals received from ratio of pulse width of each synchronization signal to the standard time interval;
   obtaining intervals of respective synchronization signals received;

redefining, when any of the standard time interval, combination of types of synchronization signals included in the standard time interval, and intervals between the respective synchronization signals changes, supply power values corresponding to respective types of synchronization signals included in the plurality of types of synchronization signals received; and changing, after a first delay time from a leading edge of a synchronization signal received, the setting of output power of the power supply unit to a supply power value corresponding to a type of the synchronization signal.

7. The method according to claim 6, wherein redefining supply power values includes finding a total, for the standard time interval, of products of supply power ratios corresponding to the respective types of synchronization signals and the intervals of the respective synchronization signals and calculating the supply power values corresponding to the respective types of synchronization signals so that the total becomes constant.

8. A program product for causing a control unit of a power supply unit capable of varying power supplied to a light source at timings determined by synchronization signals, the program comprising:

changing, when a plurality of types of synchronization signals with different pulse widths are received via an interface, by the control unit, a setting of output power of the power supply unit in accordance with the pulse widths of the plurality of synchronization signal types that have been received;

wherein the changing the setting of output power includes:

obtaining a standard time interval from a cycle of a standard type of synchronization signal that has a longest pulse width out of the plurality of types of synchronization signals received;

determining type of each synchronization signal included in the plurality of types of synchronization signals received from ratio of pulse width of each synchronization signal to the standard time interval;

obtaining intervals of respective synchronization signals received;

redefining, when any of the standard time interval, combination of types of synchronization signals included in the standard time interval, and intervals between the respective synchronization signals changes, supply power values corresponding to respective types of synchronization signals included in the plurality of types of synchronization signals received; and changing, after a first delay time from a leading edge of a synchronization signal received, the setting of output power of the power supply unit to a supply power value corresponding to a type of the synchronization signal.

* * * * *